(12) United States Patent
Frangineas

(10) Patent No.: US 8,111,438 B2
(45) Date of Patent: Feb. 7, 2012

(54) OPTICAL PATTERN GENERATOR USING MULTIPLE REFLECTIVE SURFACES

(75) Inventor: George Frangineas, Fremont, CA (US)

(73) Assignee: Reliant Technologies, Inc., Mountain View, CA (US)

( * ) Notice: Subject to any disclaimer, the term of this patent is extended or adjusted under 35 U.S.C. 154(b) by 528 days.

(21) Appl. No.: 12/238,310

(22) Filed: Sep. 25, 2008

(65) Prior Publication Data

US 2009/0080050 A1 Mar. 26, 2009

Related U.S. Application Data

(60) Provisional application No. 60/975,087, filed on Sep. 25, 2007.

(51) Int. Cl.
*G02B 26/08* (2006.01)
*G02B 26/10* (2006.01)
*G02B 26/12* (2006.01)

(52) U.S. Cl. .................................. 359/216.1; 359/226.1
(58) Field of Classification Search .............. 359/197.1, 359/201.1, 201.2, 202.1, 203.1, 212.1–213.1, 359/216.1–217.1, 223.1, 226.1, 226.2; 347/231, 347/259–261; 235/462.38–462.4
See application file for complete search history.

(56) References Cited

U.S. PATENT DOCUMENTS

| | | | | |
|---|---|---|---|---|
| 4,768,861 A | * | 9/1988 | Epner | 219/121.64 |
| 4,932,733 A | * | 6/1990 | Loy | 359/216.1 |
| 4,993,791 A | * | 2/1991 | Burt et al. | 359/217.1 |
| 2005/0285928 A1 | * | 12/2005 | Broome et al. | 347/235 |
| 2010/0027090 A1 | * | 2/2010 | Lettington | 359/201.2 |

* cited by examiner

*Primary Examiner* — Stephone Allen
*Assistant Examiner* — Kimberly N Kakalec
(74) *Attorney, Agent, or Firm* — Wood, Herron & Evans, LLP

(57) ABSTRACT

An optical pattern generator uses reflection from multiple (e.g., two) internal mirror surfaces mounted on a rotating support structure.

22 Claims, 4 Drawing Sheets

OPTICAL PATTERN GENERATOR USING MULTIPLE REFLECTIVE SURFACES

CROSS-REFERENCE TO RELATED APPLICATION

This application claims priority under 35 U.S.C. §119(e) to U.S. Provisional Patent Application Ser. No. 60/975,087, "Optical Pattern Generator Using Multiple Reflective Surfaces," filed Sep. 25, 2007 by George Frangineas. The subject matter of the foregoing is incorporated herein by reference in its entirety.

BACKGROUND OF THE INVENTION

1. Field of the Invention

This invention relates generally to optical pattern generators, scanners, multiplexers, and optical switches that deliver an image point to a plurality of locations or that detect objects located at a plurality of locations. Such devices can be used in fields including multiplexed illumination of fibers, medical treatment in MTZ (micro-thermal-zone) applications, industrial high-speed micro-welders, and related applications.

2. Description of the Related Art

The optical generation of a pre-defined pattern of spots or scan lines is used in a variety of applications. Digital copiers, printers, fingerprint identification, hand-held bar code scanners, industrial applications, light show entertainment, displays, telecommunications switching and medical applications are a few examples. Perhaps the most common mechanisms for generating patterns of figures are tilting mirrors (e.g., oscillating mirrors driven by galvanometers) and reflections from rotating convex polygons.

However, optical pattern generators based on tilting mirrors typically have characteristics that make them unsuitable for certain applications. For example, scanning in these systems is typically achieved by tilting a mirror back and forth. But back and forth motion requires that the mirror come to a stop and then reverse direction. This takes time, which limits the scan rate. In order to increase the scan rate of these systems, the mirror often is driven with an oscillating motion at a rate that is near its resonant frequency. However, this severely restricts the patterns that can be generated. For example, it is difficult to generate irregular patterns since the mirror motion is constrained to be oscillatory. The near-resonance condition also limits the range of scan rates that can be achieved. For example, it is difficult to tune such a system over a wide range of scan rates since the near-resonance condition cannot be met over a wide range. In addition, the angular scan velocity of resonant scanners is usually sinusoidal and not suitable for a large number of applications where dwell time at each point must be reasonably constant.

If a two-dimensional pattern is desired (e.g., a series of parallel scan lines or a two-dimensional pattern of spots), then typically either a single mirror is tilted in two directions simultaneously or two coordinated, tilting mirrors are used. In many cases the efficiency of the utilization of light, such as laser light, is also important. The efficiency may be defined as the fraction of energy deposited in a desired pattern on the treatment surface compared to the total energy produced by the light source in a given period of time. If a pattern is sparse compared to the background, it is preferable to turn off the light source and scan quickly over the background, and then turn it back on when the light beam has settled over the spot to be exposed and expose the spots in the pattern in such a manner that the light source is efficiently utilized in time. This requires an even more responsive device that can accelerate, decelerate and settle quickly. As a result of these characteristics, galvanometer-based systems and convex polygon systems are not well suited for high speed pattern generation, particularly if the pattern is an irregular or a sparse one.

In the rotating polygon approach, the sides of a three-dimensional polygon are mirrored and the polygon is rotated about a center axis. As each mirrored side rotates through an incident optical beam, the optical beam is reflected to generate a point on a scan line. The rotation of each mirrored side through the optical beam produces one scan line. If all of the mirrored sides are the same (e.g., make the same pyramid angle with the base of the polygon), then the same scan line is traced over and over. If the mirrored sides are different, then different scan lines can be traced as each side rotates through the optical beam. For example, by varying the pyramid angle of each side, the reflected optical beam can trace a series of scan lines.

However, the rotating polygon approach also has drawbacks that make it unsuitable for certain applications. For example, systems that produce a series of scan lines can suffer from aberrations due to the rotation. In order to trace a series of scan lines, each side has a different pyramid angle that offsets the basic scan line in a direction that is perpendicular to the scan direction. However, as each side rotates through the optical beam, the orientation of the angled side is also rotated. This can cause changes in the amount of offset and/or other unwanted aberrations. One example is scan line bow. The ideal scan line is generally a straight line segment but the actual scan line is often an arc segment. The sag of the arc segment is the bow. In the case of rotating polygon scanners, sides that have non-zero pyramid angles generate bowed scan lines. The amount of bowing depends on the pyramid angle. In a polygon scanner where different pyramid angles are used to trace multiple scan lines or to generate spots at different locations, not only will each scan line be bowed, but the bow will vary from one scan line to the next. The difference between the bow of the top-most scan line and the bottom-most scan line can be significant.

Scan line bow and other effects caused by rotation can cause additional problems, depending on the application. For example, in some applications, the scanning action is used to compensate for motion of the scanner relative to a target so that the optical beam ideally remains at a fixed spot on the target even though the scanner is moving relative to the target. In this case, scan line bow will cause the optical beam to move in the direction perpendicular to the scan direction. If this motion is slow compared to the dwell time of the optical beam on the target, then the bow effectively introduces an unwanted motion in the perpendicular direction. If the motion is fast relative to the dwell time of the optical beam on the target, then the bow, which is a radial deflection, when combined with the uncompensated tangential motion, effectively blurs the optical beam, increasing the spot size of the beam on the target. Typically, neither effect is desirable.

Thus, there is a need for optical pattern generators than can operate at high speeds, possibly with long dwell times at each image point, particularly for the generation of irregular patterns. There is also a need for pattern generators with reduced aberrations and/or image blurring.

SUMMARY OF THE INVENTION

The present invention overcomes limitations of the prior art by providing an optical pattern generator using a single rotating disk with reflective surfaces arranged so that an incident optical beam reflects from multiple (e.g., two) reflective surfaces on the disk.

In one class of designs, flat mirrors are arranged on the periphery of the disk with the mirror normals lying nearly radial to the axis of disk rotation. An incident beam reflects from the internal surfaces of two of these mirrors which are located on opposing sides of the rotating disk.

The sets of flat mirrors are arranged with one edge on the top of the rotating disk. The normal of each mirror does not lie in a plane exactly parallel to the disk surface. Each pair of opposing mirrors have their normals lying at a small angle above a plane parallel to the disk surface, and each mirror-pair can have its normals lying at a different angle to the plane parallel to the rotating disk surface. An incident optical beam that is directed at the rotation axis of the disk is also inclined so that it passes over the top of the rotating mirrors and is incident on the internal surface of one of the mirror-pair surfaces, which is called mirror M1. The beam is reflected from M1 onto its opposing mirror in the pair and is subsequently reflected by this mirror, which is called M2, over the top of the rotating mirrors and is subsequently focused by a lens on a target surface.

Each mirror-pair in sequence along the periphery of the rotating disk can have a slightly different tilt angle, so the exiting beam from each sequential mirror-pair has a different exit angle and forms an image at a different point on the target surface. As long as the incident beam falls on the surfaces of one mirror-pair, the output beam angle (and the image point produced by the lens) remains invariant. The pattern generator therefore produces an image point that "dwells" for a fixed period of time at one location and when the mirror-pair is replaced by its neighboring mirror-pair the image point is very rapidly switched to another fixed image point.

This particular example geometry has all of the mirror surfaces tilted outward from the supporting rotating disk surface such that the component can be easily manufactured by injection-molding, electroforming, or epoxy-replication methods. In other words, the internal surfaces of the component have positive draft that allows the part to be easily removed from the tool from which it is formed.

The pattern that is generated by this device does not have to produce image points in sequence along a line but can instead produce points at specific points of interest along the line. A change in the image pattern geometry is easily performed by replacing one disk with another disk having a different set of mirror tilt angles along its periphery. It is also possible to use mirror-pairs that have a different width from their neighboring mirror-pairs such that the dwell time at each image point can be different from point to point.

The pattern generator described to this point produces a set of point images along a line locus at the target plane using mirror-pairs that have surfaces tilted in one plane, but parallel to one another in the orthogonal plane. By using mirror-pairs that also have a small angle between their surfaces in the orthogonal plane it is possible to produce image patterns that are also displaced from the line locus and which have a 2D geometry. This angle will be referred to as the twist angle.

One advantage of this approach is in the packaging volume. Because the incident beam is directed into the pattern generating wheel through the rotation axis of the device and then internally reflects twice before exiting to the imaging lens, the folded geometry of the optical path keeps the package volume to a minimum. The small size of the pattern generating wheel permits the drive motor to be small while providing high rotational velocities, and this reduces the weight of the product. These attributes are important to many medical products that preferably are hand-held.

Another advantage is the potential speed of this device. Galvanometer-based and piezoelectric driver-based pattern generators typically can switch from one image point to another image point in the ten millisecond time domain. These devices can easily switch from one image point to another image point in less than one millisecond.

Other aspects of the invention include methods corresponding to the devices described above, and applications for the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
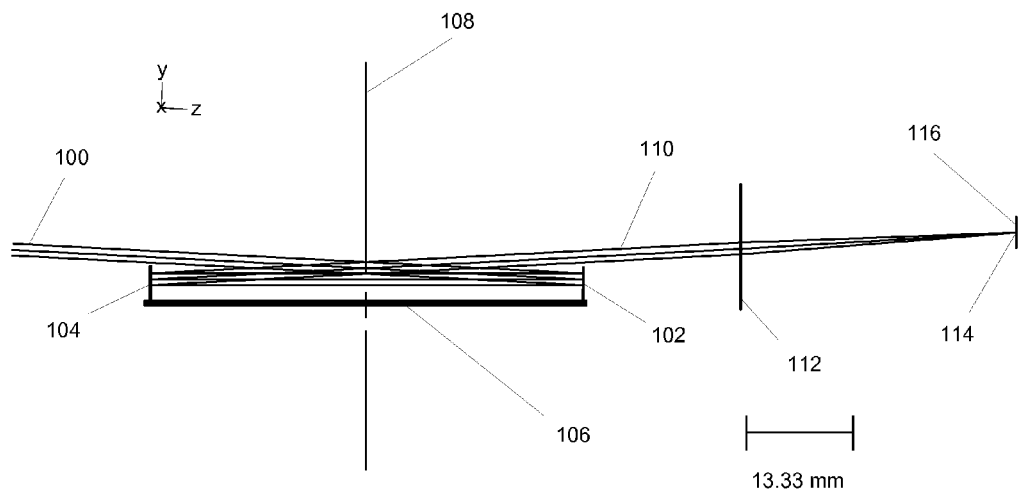
FIG. 1 is a side view of one embodiment of an optical pattern generator according to the invention, showing the optical path for one mirror-pair producing one image point.
Figure 2:
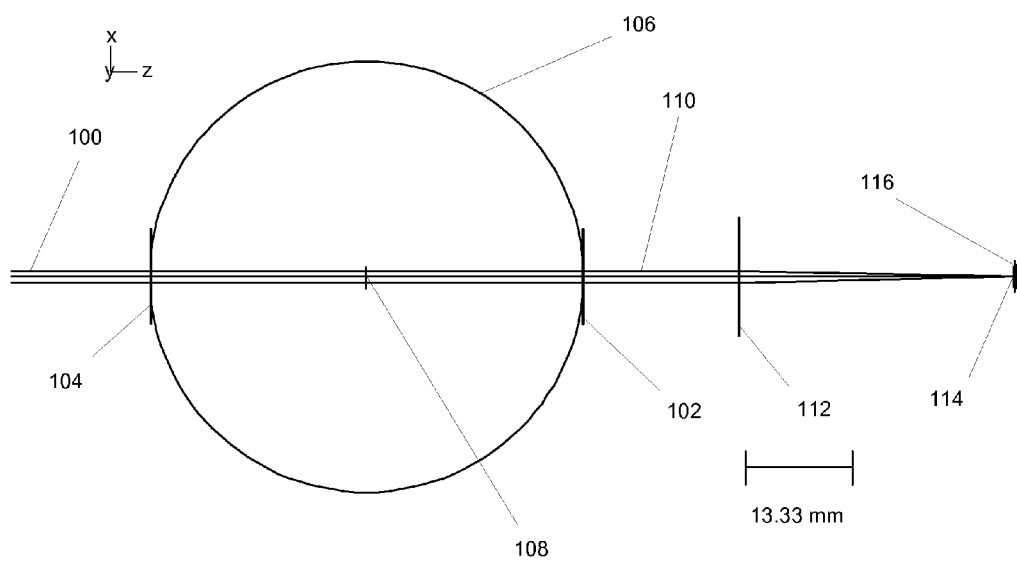
FIG. 2 is a top view of the pattern generator of FIG. 1, showing the optical path for one mirror-pair producing one image point at one rotational position of the rotating disk.

FIGS. 1 and 2 are a side view and top view of one embodiment of an optical pattern generator showing the optical path for one mirror-pair producing one image point. An incident ray fan from a collimated source or laser beam 100 is injected onto the internal reflecting surface of mirror 102. The beam is reflected to mirror 104 and exits as output beam 110. The rotating disk 106 with center of rotation 108 supports mirrors 102 and 104, here shown at the disk periphery. For convenience, the term "plane of rotation" will be used to refer to the plane that is perpendicular to the rotational axis 108. In this example, the disk 106 lies and rotates primarily within the plane of rotation. As the disk 106 rotates, the output beam 110 does not change angle as long as the beam 110 remains incident on the mirror-pair 102-104. The output beam 110 is focused by lens 112 as an image point 114 on target surface 116. Since output beam 110 is invariant in angle, image point 114 will also be invariant in location as the mirror-pair 102-104 rotates through the incident beam 100.

This geometry is further shown in FIG. 2, which is a top view of the pattern generator for the condition where only one rotational angle of one mirror-pair 102 and 104 forms an image 114 on the target surface 116. From this figure it is observed that for the condition where the normals of the mirror-pair are collinear with the entry beam 100, the optical path reflects from mirror 102 and mirror 104 and the exit beam 110 is collinear to the entry beam 100 (in this view).

Figure 3:
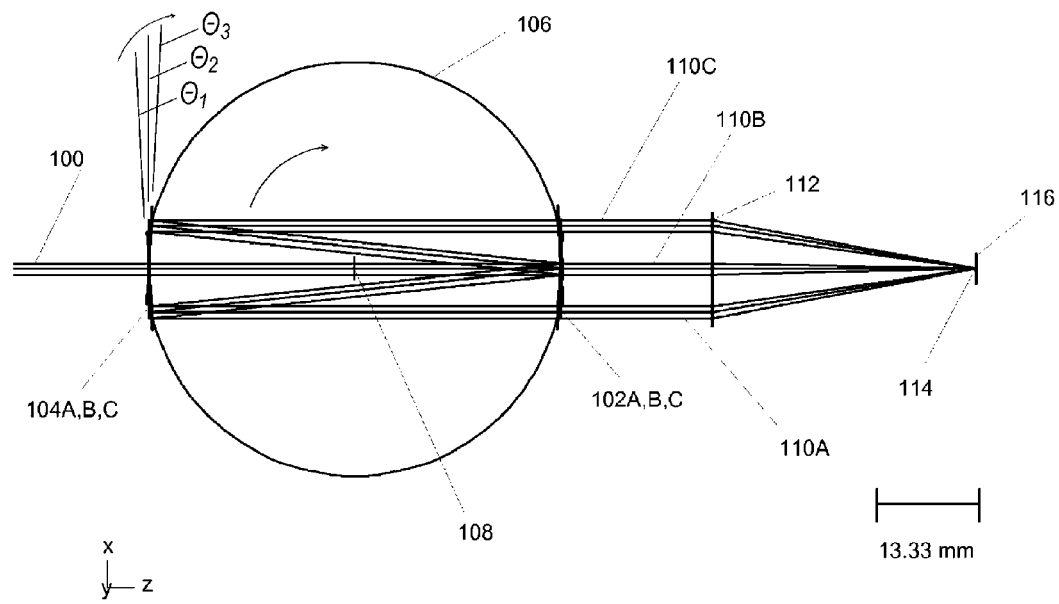
FIG. 3 is a top view of the pattern generator of FIG. 1, showing the optical path for one mirror-pair producing one image point at three sequential rotational positions of the rotating disk.

FIG. 3 shows the same system arrangement, but in this case three rotation angles of the minors 102 and 104 are shown as 102A, 102B, 102C and 104A, 104B, and 104C. For any rotation angle of the mirror-pair 102-104, the exit beam 110A, 110B, or 110C has the same exit angle and therefore is focused on the same image point 114. Note that the three exit beams 110A, 110B, and 110C are laterally displaced and represent a large (and moving with rotation angle) exit pupil. This movement of the exit pupil can be advantageously used in some applications such as high-speed welding, where movement of the defocused image point enhances the weld melt behavior. The reflective surfaces of at least one of the minor-pairs 102-104 has a different twist angle, $\theta_1$-$\theta_3$, than the reflective surfaces of a different one of the mirror-pairs 102-104. The twist angle of a reflective surface is defined as the angle between a radial direction for the rotational axis 108 and a projection of a surface normal of the reflective surface onto the plane of rotation.

Figure 4:
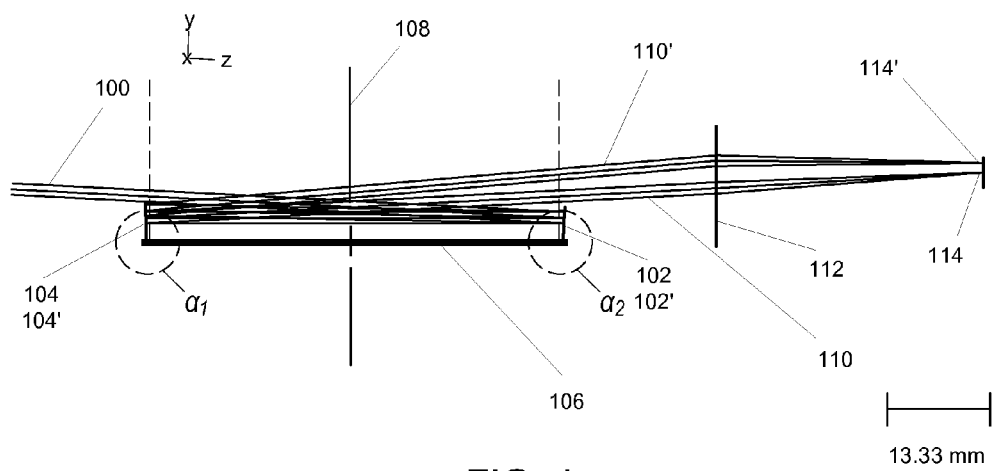
FIG. 4 is a side view of the pattern generator of FIG. 1, showing the optical path for two mirror-pairs subsequently introduced to the optical path by rotation of the disk and the two image points produced by these mirror-pairs.

FIG. 4 is a side view of the pattern generator for the condition where two sets of mirror-pairs with different tilt angles, $\alpha_1$ are shown. That is, mirror-pair 102-104 is tilted at a different angle, $\alpha_1$, with respect to the disk 106 than the tilt angle, $a_2$ of minor pair 102'-104'. The tilt angle of a reflective surface, such as the reflective surface of minor-pair 102-104 and the reflective surface of mirror pair 102'-104', is defined as the angle between the plane of rotation and a surface normal of the reflective surface. As the disk 106 rotates about axis 108, two sequential minor-pairs on the disk periphery intercept the optical beam. Each mirror-pair 102-104 or 102'-104' produces a different exit beam 110 or 110', which form image points 114 and 114' on the target surface 116.

Figure 5:
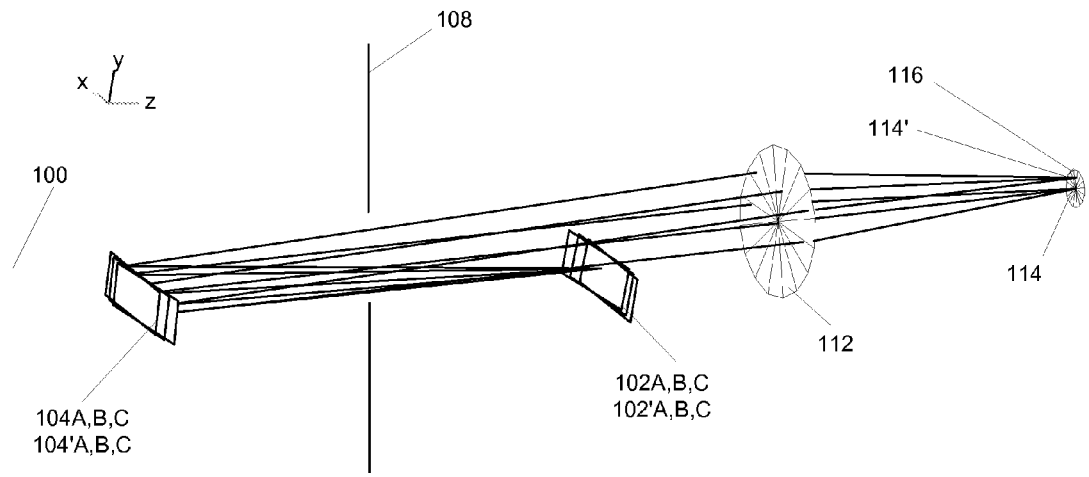
FIG. 5 is a perspective view of the pattern generator of FIG. 1, showing the optical paths for two image points produced by three rotational positions for each of two mirror-pairs on the rotating disk.

FIG. 5 is a perspective view of the pattern generator which shows the compactness of this approach. Six optical paths are shown which are associated with two sets of mirror-pairs 102-104 and 102'-104' each shown in three rotational positions, A, B, or C. The optical beam formed by mirror-pair 102-104 through rotation angles A, B, and C all form an image 114 at the same location on target surface 116. Similarly, the optical beam formed by mirror-pair 102'-104' through rotation angles A, B, and C all form an image 114' at the same location on target surface 116.

Figure 6:
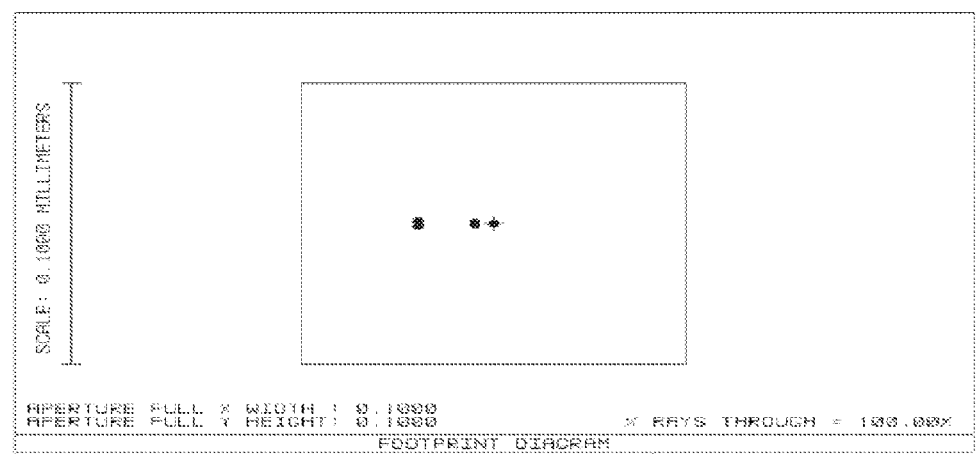
FIG. 6 is view of the target surface showing high degree of beam position fixation through the full clear aperture of a facet.

FIG. 6 show the beam position on a target located in the focal plane of a focusing lens placed in the exit beam path of the rotating scan element. The maximum peak to peak angular deflection in this example is <1 milliradian. After the 25 mm focusing lens in this example, the total peak to peak beam fixation error is less than 20 microns over a full scan clear aperture. This error is small compared to the laser delivered beam size in many applications.

Figure 7:
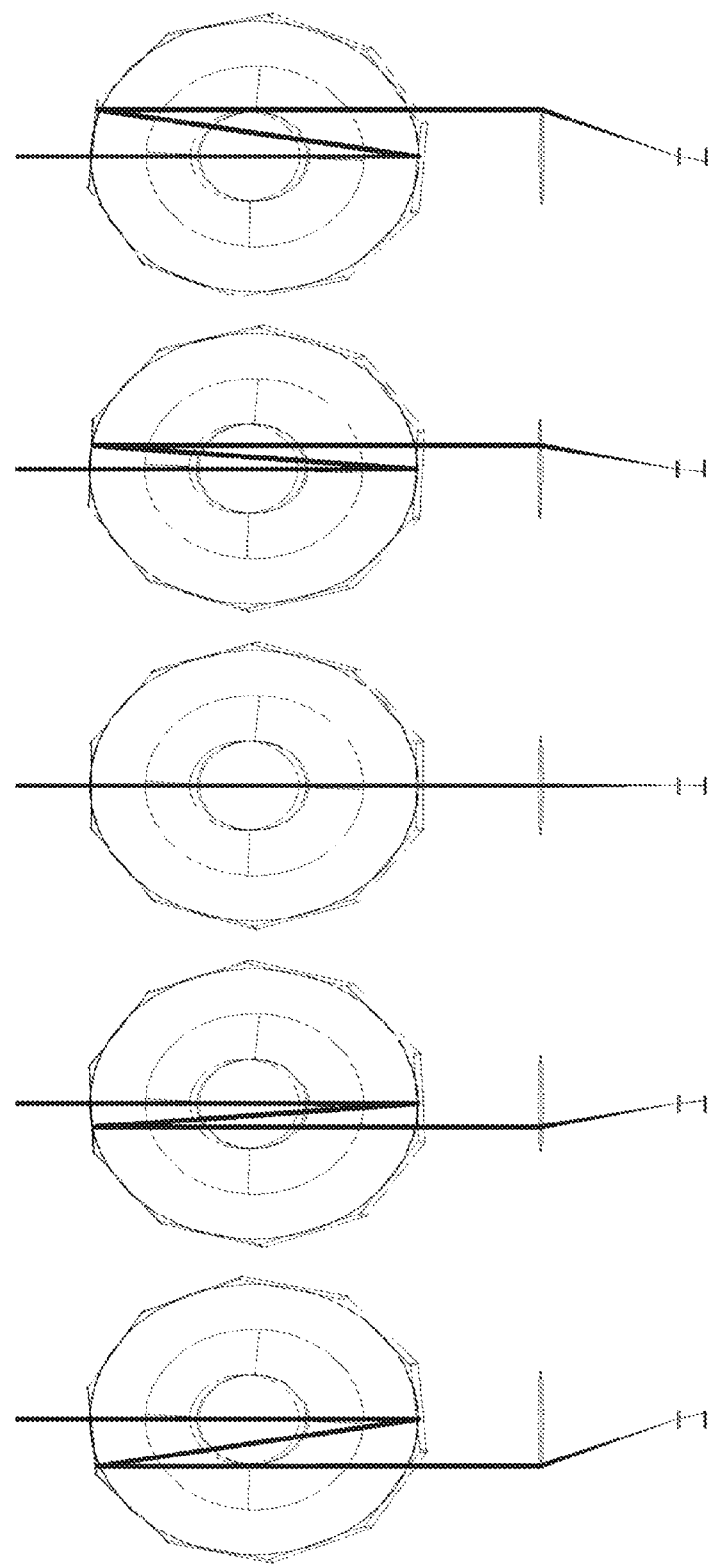
FIG. 7 is a top view of beam paths at different angles of rotation over the full clear aperture rotation of the internal mirror scan element.

FIG. 7 is a top composite view showing a ten-faceted scan element at 5 rotation angles over the full clear aperture of one of the mirror pairs. The range of rotation is +/−5 degrees in steps of 2.5 degrees. The center diagram shows the 0 degree position has negligible displacement in the top view. At each rotation angle within the clear aperture of a facet, the beam maintains nearly constant angle.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein.

The invention claimed is:

1. An optical pattern generator for directing an incident optical beam to generate a pattern of figures, the optical pattern generator comprising:
a support structure that rotates around a rotational axis, the rotational axis defining a plane of rotation that is perpendicular to the rotational axis;
a plurality of pairs of reflective surfaces supported by the support structure and rotating with the support structure around the rotational axis, all reflective surfaces positioned approximately in the plane of rotation at a same distance from the rotational axis, the reflective surfaces in each pair positioned approximately on opposite sides of the rotational axis and approximately facing each other;
wherein for each pair of reflective surfaces, as one of the reflective surfaces in the pair rotates through the incident optical beam, the incident optical beam reflects off said reflective surface to the other reflective surface, and reflects off the other reflective surface to exit as an output optical beam, the output optical beam propagating in a direction that is substantially invariant as the pair of reflective surfaces rotates through the incident optical beam;
wherein normals for each of the reflective surfaces are substantially collinear with the incident optical beam as the incident optical beam reflects off of each reflective surface;
wherein, for all pairs of reflective surfaces, the direction of propagation of the incident optical beam and the direction of propagation of the exit optical beam differ by less than 20 degrees; and
wherein the incident optical beam and the exit optical beam are substantially collinear.

2. The optical pattern generator of claim 1 wherein, for all pairs of reflective surfaces, the direction of propagation of the incident optical beam and the direction of propagation of the exit optical beam differ by less than 10 degrees.

3. The optical pattern generator of claim 1 wherein, for all pairs of reflective surfaces, the direction of propagation of the incident optical beam and the direction of propagation of the exit optical beam lie primarily in a plane that is substantially perpendicular to the rotational axis.

4. The optical pattern generator of claim 1 wherein the reflective surfaces of one pair have a different tilt angle than the reflective surfaces of a different pair, the tilt angle of a reflective surface defined as the angle between the plane of rotation and a surface normal of the reflective surface.

5. The optical pattern generator of claim 1 wherein the reflective surfaces of each pair have a different tilt angle than the reflective surfaces of every other pair, the tilt angle of a reflective surface defined as the angle between the plane of rotation and a surface normal of the reflective surface.

6. The optical pattern generator of claim 1 wherein, for each pair of reflective surfaces, both reflective surfaces have a same tilt angle, the tilt angle of a reflective surface defined as the angle between the plane of rotation and a surface normal of the reflective surface.

7. The optical pattern generator of claim 1 wherein all reflective surfaces are tilted outward.

8. The optical pattern generator of claim 1 wherein the reflective surfaces of one pair have a different twist angle than the reflective surfaces of a different pair, the twist angle of a reflective surface defined as the angle between a radial direction for the rotational axis and a projection of a surface normal of the reflective surface onto the plane of rotation.

9. The optical pattern generator of claim 1 wherein the reflective surfaces of each pair have a different twist angle than the reflective surfaces of every other pair, the twist angle of a reflective surface defined as the angle between a radial direction for the rotational axis and a projection of a surface normal of the reflective surface onto the plane of rotation.

10. The optical pattern generator of claim 1 wherein the reflective surfaces of one pair have a different width than the reflective surfaces of a different pair.

11. The optical pattern generator of claim 10 wherein the reflective surfaces of each pair have a different width than the reflective surfaces of every other pair.

12. The optical pattern generator of claim 1 wherein at least one reflective surface is not flat.

13. The optical pattern generator of claim 1 wherein all reflective surface surfaces are flat.

14. The optical pattern generator of claim 1 wherein each pair of reflective surfaces rotates through the incident optical beam in 1 ms or less.

15. The optical pattern generator of claim 1 wherein the plurality of pairs of reflective surfaces includes at least five pairs of reflective surfaces.

16. The optical pattern generator of claim 1 wherein the reflective surfaces are mirrors.

17. The optical pattern generator of claim 1 wherein the reflective surfaces are non-reflective structures covered by a reflective coating.

18. The optical pattern generator of claim 1 wherein the support structure is a disk and the reflective surfaces are mounted to the disk.

19. The optical pattern generator of claim 1 wherein the support structure and reflective surfaces comprise a monolithic structure, the monolithic structure including the reflective surfaces.

20. The optical pattern generator of claim 1 wherein the support structure and reflective surfaces comprise a monolithic structure with non-reflective surfaces covered by a reflective coating.

21. The optical pattern generator of claim 20 wherein the monolithic structure is formed by injection molding, electroforming or epoxy-replication.

22. The optical pattern generator of claim 18, wherein the disk has an outer peripheral edge, and the reflective surfaces are mounted to the outer peripheral edge of the disk.

* * * * *

UNITED STATES PATENT AND TRADEMARK OFFICE
CERTIFICATE OF CORRECTION

PATENT NO. : 8,111,438 B2  
APPLICATION NO. : 12/238310  
DATED : February 7, 2012  
INVENTOR(S) : George Frangineas Page 1 of 1

It is certified that error appears in the above-identified patent and that said Letters Patent is hereby corrected as shown below:

In the Specification:

At column 5, line number 21, change "minor" to --mirror-- and at line number 31, change "minor" to --mirror-- and at line number 32, change "minor" to --mirror-- and at line number 36, change "minor" to --mirror--.

In the Claims:

At column 7, claim number 13, line number 23, after reflective, delete "surface".

Signed and Sealed this
Seventeenth Day of July, 2012

David J. Kappos
*Director of the United States Patent and Trademark Office*